Jan. 9, 1923.

D. F. FESLER.
LUBRICATING DEVICE.
ORIGINAL FILED NOV. 18, 1918

1,441,334

Inventor
Douglas F. Fesler
Attorneys

Patented Jan. 9, 1923.

1,441,334

UNITED STATES PATENT OFFICE.

DOUGLAS F. FESLER, OF CHICAGO, ILLINOIS, ASSIGNOR TO THE BASSICK MANUFACTURING COMPANY, A CORPORATION OF DELAWARE.

LUBRICATING DEVICE.

Original application filed November 18, 1918, Serial No. 262,930, now Patent No. 1,387,843, dated August 16, 1921. Divided and this application filed May 28, 1920. Serial No. 384,929.

*To all whom it may concern:*

Be it known that I, DOUGLAS F. FESLER, a citizen of the United States, residing at Chicago, in the county of Cook and State of Illinois, have invented a certain new and useful Improvement in Lubricating Devices, of which the following is a full, clear, concise, and exact description, reference being had to the accompanying drawings, forming a part of this specification.

My invention relates to improvements in a lubricating device, and is especially concerned with means for supplying lubricant under pressure to bearings or other surfaces to be lubricated. My invention comprises means whereby lubricant under high pressure can be initially supplied to the surfaces to be lubricated and other means for thereafter supplying lubricant to said surfaces at a considerably reduced pressure.

The objects of my invention are:

1st. To provide apparatus for performing the above functions, comprising in general a grease cup having a plunger therein, a spring confined between one end of the grease cup and the plunger, means for supplying lubricant under pressure to the space between the other side of the plunger and the opposite end of the grease cup, and means for conducting lubricant from said space to the bearing or surface to be lubricated, the means for supplying lubricant to said space under pressure comprising a grease gun or compressor, such as that disclosed in my co-pending application, Serial No. 262,930, filed November 18, 1918 of which this application constitutes a division, and which comprises a discharge nozzle and means for detachably connecting the discharge nozzle of the grease gun with the grease cup.

2nd. To provide a system of the character described in which means is provided for supporting the plunger against the pressure of the lubricant when the grease cup is completely filled by lubricant under pressure, so that additional pressure can be exerted upon the lubricant in order to force it into the bearing with which the grease cup is connected under an extremely high pressure, whereby a supply of lubricant is insured to every point of contact of the bearing.

3rd. To provide a grease cup of novel construction forming a part of the above-described system which is simple in construction and economical to manufacture; and 4th. To provide a grease cup of the type described having means for indicating the amount of lubricant which it contains.

Figure 1:
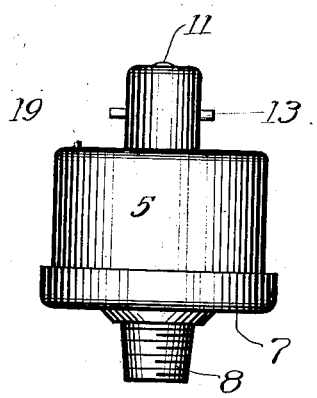
Figure 2:
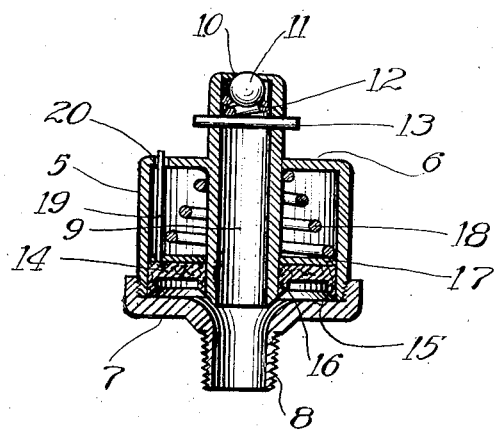

Other objects will appear as this description progresses, reference being had to the accompanying drawings in which Figure 1 is a side elevation of a grease cup embodying my invention, and Figure 2 is a central longitudinal section therethrough.

Referring to the drawings, the reference character 5 indicates, as a whole, a cylindrical lubricant receptacle having the end closure 6 integrally formed therewith and the end closure 7 detachably secured thereto. The end closure 7 is provided with a screw-threaded tubular extension 8 by means of which the device can be secured to a bearing to be lubricated.

A tubular member 9 extends through the end closure 6 and is formed integrally therewith. The inner end of the tubular member 9 extends inwardly from the end closure 6 to a point adjacent the inner side of the end closure 7, there being sufficient space left between these two members to permit the passage of lubricant therebetween without excessive resistance. The outer end of the tubular member is flanged over, as shown at 10 and provided with the ball closure 11 which is held in its closed position by means of a spring 12, one end of which abuts against the closure 11 and the other end of which rests upon the pin 13 which extends through and from both sides of the outer end of the tubular member 9.

A cup leather 14 is slidably mounted upon the inner end of the tubular extension 9 and is provided with flanges 15 and 16 for maintaining sealing contacts with the cylindrical walls of the lubricant receptacle and the outside of the tubular member 9, respectively.

Reference character 17 indicates a back plate or follower resting upon the cup leather 14. The plunger thus described is urged toward the end closure 7 by means of a spiral spring 18, one end of which abuts against the end closure 6.

A small rod or pin 19 is secured to the follower 17 and its outer end projects through an opening 20 in the end closure 6. The pin 19, therefore, serves as an indicator to indicate the amount of lubricant remaining in the receptacle.

When it is desired to supply lubricant to a bearing provided with my improved lubricating device, the discharge conduit of a lubricant compressor similar to that illustrated in the patent to Arthur V. Gullborg, No. 1,307,734 of June 24, 1919, or that shown in my co-pending application, Serial No. 262,930, filed November 18, 1918, of which this application constitutes a continuation, is connected with the outer end of the tubular member 9 and actuated to exert pressure on the lubricant contained therein. The lubricant is thereupon forced past the closure 11 which is opened by the pressure of the lubricant through the tubular member 9 and the tubular extension 8 to the bearing. Ordinarily, the resistance of the bearing will be sufficient to cause the lubricant to then back up in the receptacle 5, lifting the spring-pressed plunger until the convolutions of the spring 18 are all brought into contact with the inner side of the end closure 6, whereupon the movement of the plunger is arrested. If the pressure upon the lubricant in the compressor is then increased, the lubricant will be forced between the bearing surfaces dislodging and forcing out the used lubricant and replacing it with new. When sufficient lubricant has been supplied to the bearing, the compressor is detached from the outer end of the tubular member 9. Thereafter the spring 18 will exert a constant pressure upon the plunger which will be considerably less than that exerted by the compressor but sufficient to maintain a small but constant supply of lubricant to the bearing.

While I have described the details of the preferred embodiment of my invention, it is to be clearly understood that my invention is not limited to these details, but is capable of other adaptations and modifications within the spirit and scope of the appended claims.

Having thus described my invention, what I claim is:—

1. A lubricating device comprising a lubricant receptacle having end members, one of which is provided with a screw-threaded tubular extension for securing said device to a part to be lubricated, a tubular member extending through the other end member and formed integrally therewith, the inner end of said tubular member extending to a point adjacent the first-named end member, the outer end of said tubular member being provided with an outwardly closing closure and means for making a detachable connection with the discharge conduit of a lubricant compressor, a plunger in said lubricant receptable slidably mounted on said tubular member, and means in said lubricant receptacle for yieldably urging said plunger against the lubricant in said receptacle.

2. A lubricating device comprising a lubricant receptacle having end members, one of which is provided with a tubular extension for securing said device to a part to be lubricated, a tubular member extending through the other end member, the inner end of said tubular member extending to a point adjacent the first-named member, the outer end of said tubular member being provided with an outwardly closing closure and means for making a detachable connection with the discharge conduit of a lubricant compressor, a plunger in said lubricant receptacle slidably mounted on said tubular member, and means in said lubricant receptacle for urging said plunger against the lubricant in said receptacle.

3. A lubricating device comprising a lubricant receptacle having end members, one of which is provided with a tubular extension for securing said device to a part to be lubricated, a tubular member extending through the other end member, the inner end of said tubular member extending to a point adjacent the first-named end member, the outer end of said tubular member being provided with means for making a detachable connection with the discharge conduit of a lubricant compressor, a plunger slidably mounted on said tubular member, and means in said lubricant receptacle for urging said plunger against the lubricant in said receptacle.

4. A lubricating device comprising a lubricant receptacle having a pair of end members, means for establishing communication between said lubricant receptacle and a bearing, a tube extending inwardly from one of said end members, means for connecting the discharge conduit of a lubricant compressor with the outer end of said tube, a plunger in said receptacle slidably mounted on said tube and means for maintaining said plunger in contact with the lubricant in said lubricant receptacle.

5. A lubricating device comprising a lubricant receptacle having a pair of end members, means for establishing communication between said lubricant receptacle and a bearing, a tube extending inwardly from one of said end members, means for connecting the discharge conduit of a lubricant compressor with the outer end of said tube, a plunger in said receptacle, and means for maintaining said plunger in contact with the lubricant in said lubricant receptacle.

6. The combination with a receptacle having a tube extending inwardly from one wall thereof, of means for connecting the discharge conduit of a lubricant compressor with the outer end of said tube, means mounted on said tube for expelling lubricant from said receptacle and means for conducting lubricant from said receptacle to a bearing.

In witness whereof, I hereunto subscribe my name this 21st day of May, 1920.

DOUGLAS F. FESLER.

Witnesses:
ALBIN CAHLBERG,
ANDREW WINTERCORN.